United States Patent [19]
Fujita

[11] Patent Number: 5,285,263
[45] Date of Patent: Feb. 8, 1994

[54] SAMPLE RATE CONVERTER FOR DIGITAL VIDEO SIGNALS HAVING REDUCED PHASE ERROR AND SYNC POINT COINCIDENCE

[75] Inventor: Tadao Fujita, Kanagawa, Japan
[73] Assignee: Sony Corporation, Tokyo, Japan
[21] Appl. No.: 977,857
[22] Filed: Nov. 17, 1992

[30] Foreign Application Priority Data

Nov. 20, 1991 [JP] Japan ................. 3-332544

[51] Int. Cl.⁵ .................................................. H04N 7/01
[52] U.S. Cl. ................................................ 348/441; 348/571
[58] Field of Search ............. 358/11, 13, 13 C, 22 C, 358/22, 140, 320, 319, 160, 138; 341/61; H04N 11/20, 11/02, 7/01

[56] References Cited

U.S. PATENT DOCUMENTS

| | | | |
|---|---|---|---|
| 4,597,019 | 6/1986 | Nishimoto et al. | 358/320 |
| 4,612,573 | 9/1986 | Grallert et al. | 358/140 |
| 4,870,661 | 9/1989 | Yamada et al. | 375/122 |
| 4,954,824 | 9/1990 | Yamada et al. | 341/61 |
| 5,159,339 | 10/1992 | Fujita | 341/61 |
| 5,182,633 | 1/1993 | Antonio et al. | 358/11 |

*Primary Examiner*—Victor R. Kostak
*Assistant Examiner*—Nathan J. Flynn
*Attorney, Agent, or Firm*—William S. Frommer; Alvin Sinderbrand

[57] ABSTRACT

A digital video signal processing device is capable of avoid phase difference of video signals in case of converting the rate of digital video signals. In case of converting the first digital video signal to the second digital video signal, the sync points of the first digital video signal and the second digital video signal can be coincided by coinciding the predetermined numbered clock timings of the first and second clocks with a clock synchronizing device. Since the rate is converted in utilizing a filter having a characteristic to coincide sync points of the first and second digital video signals, sync points of the first digital video signal and the second digital video signal can be coincided, so that the phase difference of video signals can be avoided in advance in either case.

5 Claims, 5 Drawing Sheets

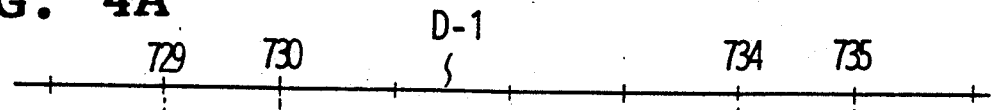
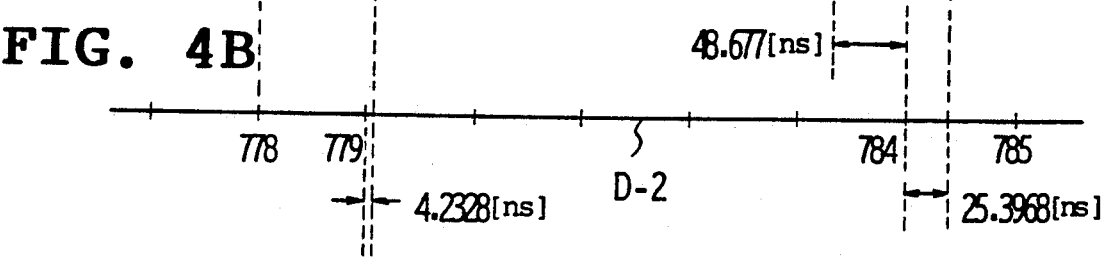
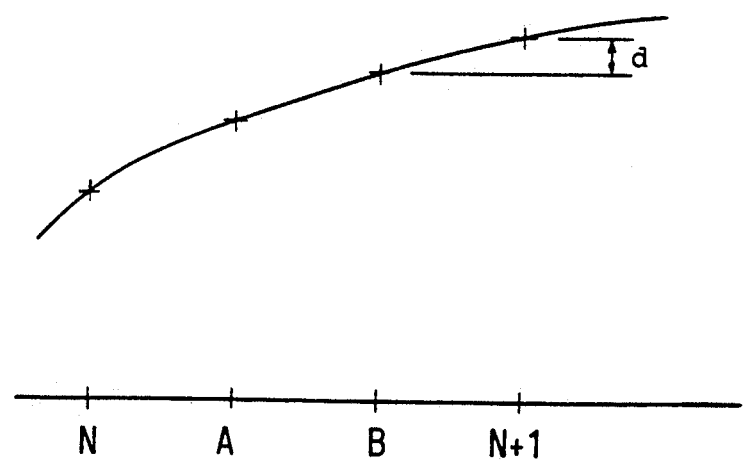
FIG. 5

SAMPLE RATE CONVERTER FOR DIGITAL VIDEO SIGNALS HAVING REDUCED PHASE ERROR AND SYNC POINT COINCIDENCE

BACKGROUND OF THE INVENTION

1. Field of the Invention

This invention relates to a digital video signal processing device, and more particularly to an improvement of a rate converter for converting a sampling rate of digital video signal.

2. Description of the Prior Art

In conventional rate converters for digital video signals, there are some which are capable of converting especially the component digital video signal of D-1 525/60 standard in the SMPTE (hereinafter referred to as a D-1 digital video signal) into the D-2 NTSC standard composite digital video signal (hereinafter referred to as a D-2 digital video signal).

Here, since the sampling frequency of D-1 digital video signal consists of 13.5 [MHz] while the sampling frequency of D-2 digital video signal is 14.3 [MHz] and they have the correlation of 33:35, there are many cases where the high over-sampling filters are constituted in the rate converters in utilizing the integer ratio.

In this case, it is a common practice that the filters to constitute in order to coincide the sample points each other periodically, and accordingly, regarding the signal element of effective part of video signal, the rate can be converted correctly.

Then, practically, according to the formats of digital video signal of D-1 and digital video signal of D-2, whereas the digital video signal of D-1 has a sample point, D-2 has no sample point in regard to 50, percent point of the dropping of sync signal (hereinafter referred to the sync point).

Accordingly, as discussed above, in the case where the filter is constituted in order that two sample points are coincident each other at an optional cycle, there is a problem that a wave form of the sync signal of D-1 digital video signal cannot be converted correctly to conform to the format of D-2 digital video signal.

Heretofore, as shown in FIG. 1, there is a rate converter 1 which generates and adds the sync signal or burst signal to conform to the format of D-2 digital video signal aside from the rate converter of effective part in the D-1 digital video signal.

In this rate converter 1, the digital video signal VD1 of D-1 is decoded via the 4:2:2 decoder (not shown) and the resultant luminance signal Y1 is inputted to the luminance rate converter 2 which is composed of the over-sampling filter, and the sampling rate is converted and the resultant luminance signal Y2 after being converted will be inputted to the first composing circuit 3.

And similarly, the color difference signals R-Y, B-Y to be obtained by decoding the digital video signal VD1 of D-1 will be inputted to the chrominance rate converters 4 and 5 which comprise the over-sampling filter respectively and the resultant post converted color difference signal will be modulated at a modulator 6 and the post modulated color signal C2 will be inputted to a composing circuit 3.

In this first composing circuit 3, the digital video signal VD2 of D-2 is generated by composing the luminance signal Y2 and the color signal C2 to be inputted, and then outputted to the second composing circuit 7. The sync signal SYNC and the burst signal BST corresponding to the D-2 format outputted from the sync additional circuit 8 are inputted to the second composing circuit 7.

With this arrangement, in the second composing circuit 7 as shown in FIG. 2A, a digital video signal VD20 of D-2 is obtained after combining the sync signal SYNC and the burst signal BST corresponding to the D-2 format in the effective part of the video signal of the digital video signal VD2 and will be outputted as an output of the rate converter 1.

However, in case of converting the rate using this kind of rate converter 1, as shown in FIG. 2A by a dashed line, there occurs a slight phase difference between the residual chroma and the regular chroma on the luminance signal because of the time base error, and accordingly the distance between the sync signal SYNC and the effective part in the video signal, i.e., the video phase may be distorted.

As against the dropping of sync signal SYNC is converted with the same correct phase as the sync signal SYNC of the digital video signal of D-1 as shown in FIG. 2B by a line, the phase difference occurs in the case where the video phase error deviates for $\Delta V$ and gap grows bigger by repeating the rate conversions and shown in FIG. 2B by a dashed line, and it has been found insufficient as a solution for practical use.

SUMMARY OF THE INVENTION

In view of the foregoing, an object of this invention is to provide a digital video signal processing device which is capable of avoiding the phase difference of the video signals in case of converting the rate of digital video signals.

The foregoing object and other objects of the invention have been achieved by the provision of a digital video signal processing device 10, as shown in FIG. 6, which comprises clock synchronizing means 14, 15, 16, 17, 18 and 19 which coincide the predetermined numbered clock timing of the first clock CK1 with the predetermined numbered clock timing of the second clock CK2 in case of converting the first digital video signal VD1 to the second digital video signal VD2 in the digital video signal processing device 10 for converting the sampling rate of the first digital video signal VD1 comprising the first format having a sync point on the prescribed sampling point as well as being samples at the first clock CK1 into second digital video signal VD2 comprising the second format having a sync point between the prescribed sampling points as well as being sampled at the second clock CK2.

Since the predetermined numbered clock timing of the first clock CK1 conforms to the predetermined numbered clock timing of the second clock CK2 in utilizing the clock synchronized means 14, 15, 16, 17, 18 and 19, in case of converting the first digital video signal VD1 into the second digital video signal VD2, thus enables that a sync point of the first digital video signal VD1 conforms to a sync point of the digital video signal VD2 and accordingly the phase difference of video signals can be avoided in advance.

Because the rate is converted in utilizing the filter means 12 and 20 having the characteristic for conforming the syn point of first digital video signal VD1 with the sync point of second digital video signal VD2, thus enables to conform sync points of the first digital video signal VD1 and the second digital video signal VD2 and accordingly the phase difference of video signals can be avoided in advance.

According to the present invention, since the predetermined numbered clock timings of the first and the second clocks are coincided by the clock synchronizing means in the case where the first digital video signal is converted to the second or digital video signal, the sync points of the first digital video signal and the second digital video signal can be coincided and accordingly, the digital video signal processing device capable of avoiding the phase difference of the video signal can be achieved.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 4A and 4B are timing charts illustrating in the vicinity of sample points of sync signals of D-1 and D-2 formats;

FIG. 5 is a characteristic curve view illustrating the characteristic of rate converter;

DETAILED DESCRIPTION OF THE INVENTION

Figure 3A:
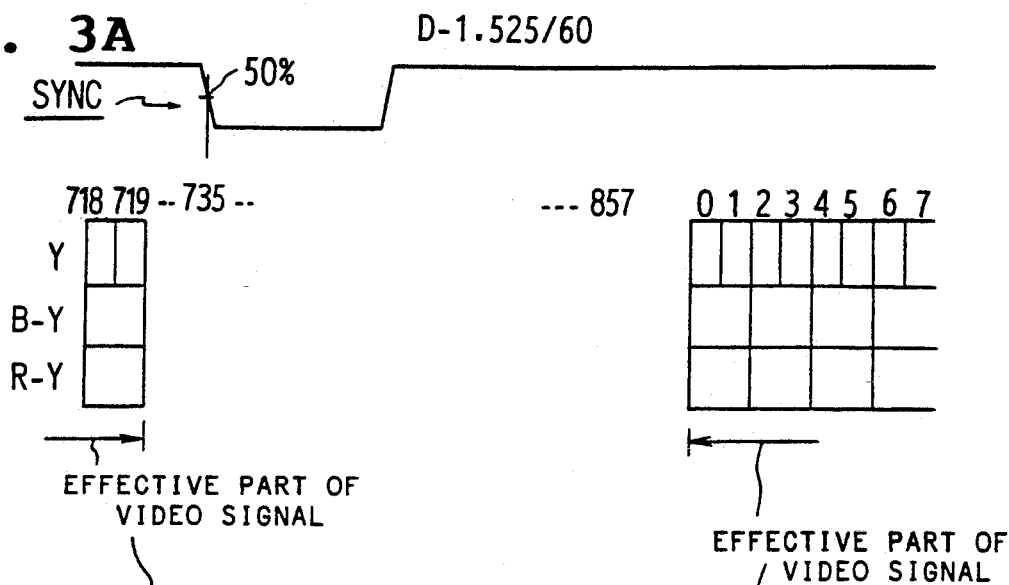
FIGS. 3A to 3C are waveform views showing the method of rate conversion to be executed by the rate conversion device according to the present invention.
Figure 3B:
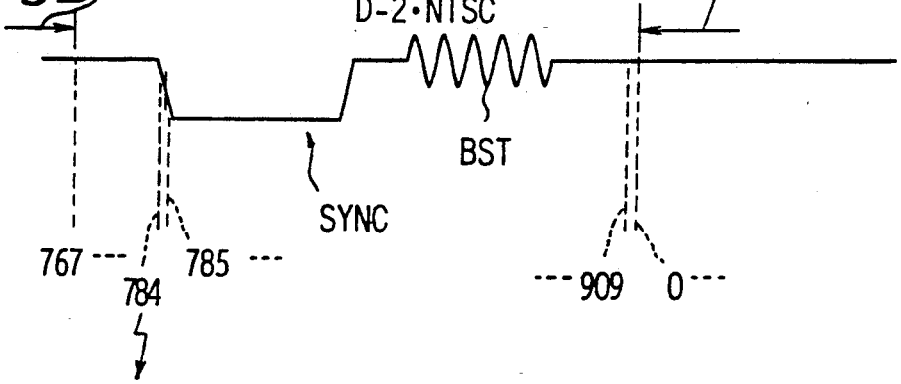

Preferred embodiments of this invention will be described with reference to the accompanying drawings:

FIGS. 3A and 3B show the relation of sync signals in the D-1 525/60 standard and the D-2 NTSC standard and practically as FIG. 3A illustrates the relation of the sample phase consisting of a sync point, i.e., 50% of the sync signal dropping and the phase of sample point in the D-1.525/60 standard, is adjusted to coincide at the sample point of 735 address.

On the other hand, in the case of D-2.NTSC standard as illustrated in FIG. 3B, there is no sample point corresponding to 50% of the sync signal dropping and where the SCH phase is zero, sampling base is I and Q base, the following formulae can be obtained:

$$69.8412698 \text{ [ns]} \times \frac{33°}{90°} = 25.60846559 \text{ [ns]} \quad (1)$$

$$69.8412698 \text{ [ns]} - 25.60846559 \text{ [ns]} = 44.23280421 \text{ [ns]} \quad (2)$$

Figure 3C:
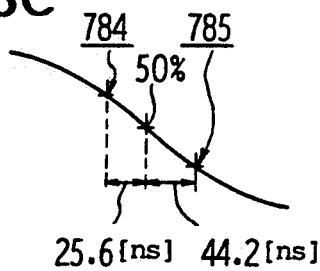

As shown in FIG. 3C, the sample points with 784 address and 785 address in front and in rear are separated 25.6 [ns] and 44.2 [ns] from 50% point respectively.

Considering the sample number per one line, the sample number of D-2 is 910 as against 858 samples in D-1 and the radio is 33:35. Accordingly, in the case where over-sampling filter for rate conversion is constituted in utilizing this ratio of 33:35, the resolving power of time base can be defined as follows:

$$\frac{\frac{1}{14.318182 \text{ [MHz]}}}{33} = 2.1164 \text{ [ns]} \quad (3)$$

$$\frac{\frac{1}{13.500000 \text{ [MHz]}}}{35} = 2.1164 \text{ [ns]} \quad (4)$$

As shown above, the resolving power of time base is 2.1164 [ns] and the distance 25.61 [ns] from the point of 50% of sync signal dropping to the nearby sample point of D-2 will become 12.1 address as described in formulae (1) and (2).

Accordingly, in this embodiment, by seeking the conversion address in order to obtain the characteristic with the minimum time base error concerning this point of sync signal, the rate conversion which coincides the sync points and has the minimum video phase error will be realized.

In the case where the D-1 is converted to the D-2 as shown in FIGS. 4A and 4B, the time data corresponding to the 23rd phase from 734 address of D-1 will be allotted as the 784 address data of D-2.

Furthermore, regarding the rate conversion from the D-1 to D-2, the following equations will be obtained:

$$33 \times 26 = 858 \quad (5)$$
$$35 \times 26 = 910 \quad (6)$$

$$\frac{1}{13.500000 \text{ [MHz]}} - \frac{1}{14.318182 \text{ [MHz]}} = \quad (7)$$

$$74.074074074 \text{ [ns]} - 69.84126984 \text{ [ns]} = 4.232804229 \text{ [ns]}$$

As shown above, since it differs twice much of the resolving power, i.e., 4.2328 [ns] per one sample, the sample points of D-1 and D-2 get closest at the 729 address of D-1 and the 778 address of D-2 in the vicinity of sync signals for the 33 or 35 cycles.

Accordingly, the sync points can be coincided and the rate conversion with the minimum video phase error can be realized by determining the phase each other in order that the sample points of 729 address of D-1 and 778 address of D-2 get closest.

Although this relation is repeated 26 times in one line with a cycle of 33 or 35 clocks, it is selected since the sample points of 729 address of D-1 and 778 address of D-2 are the closest to the sync point.

Further to this embodiment, the sync points are coincided and the rate conversion with the minimum video phase error can be realized by determining the conversion address corresponding to the characteristic of rate conversion filter and sync signal in order that the characteristic with the minimum time base error can be obtained concerning the relation of sync signals as described above.

More specifically, regarding the characteristic of rate conversion filter as shown in FIG. 5, the coincident point of 2 clocks is offset for 0.1 of the time resolving power in case of dividing a sampling section into 33 or 35; and as described in FIGS. 4A and 4B the time data corresponding to the 23rd phase of 734 address of D-1 will be seeked as the data of 784 address of D-2 in case of converting the rate from the D-1 to the D-2.

Moreover, in FIG. 5 illustrated the case of converting the signal with the sample points N and N+1 to the signal with sample points A and B as a characteristic of the rate conversion filter composed over-sampling filter, and even in the where 2 sample points are not coincided in over-sampling filter, the rate conversion can be executed.

Practically as described above in formula (7), since 4.2328 [ns] differ per one sample in the rate conversion from D-1 to D-2, sample points of D-1 and D-2 become nearest at 729 address of D-1 and 778 address of D-2 in the nearby points of sync points as described above.

Accordingly, the following formula can be obtained regarding the closest sample points of D-1 and D-2:

$$25.6085[ns] - 4.232804229[ns] \times 6 = 0.211674626[ns] \quad (8)$$

As shown above, by utilizing the rate conversion filter having a offset value of 0.211674626 [ns], i.e., the rate conversion filter with the 0.211674626 [ns] group delay characteristic, if it is constructed in order that the sample points of 729 address of D-1 and 778 address of D-2 would be nearest, the rate conversion with the minimum video phase error coinciding the sync points more precisely can be realized.

Figure 1:
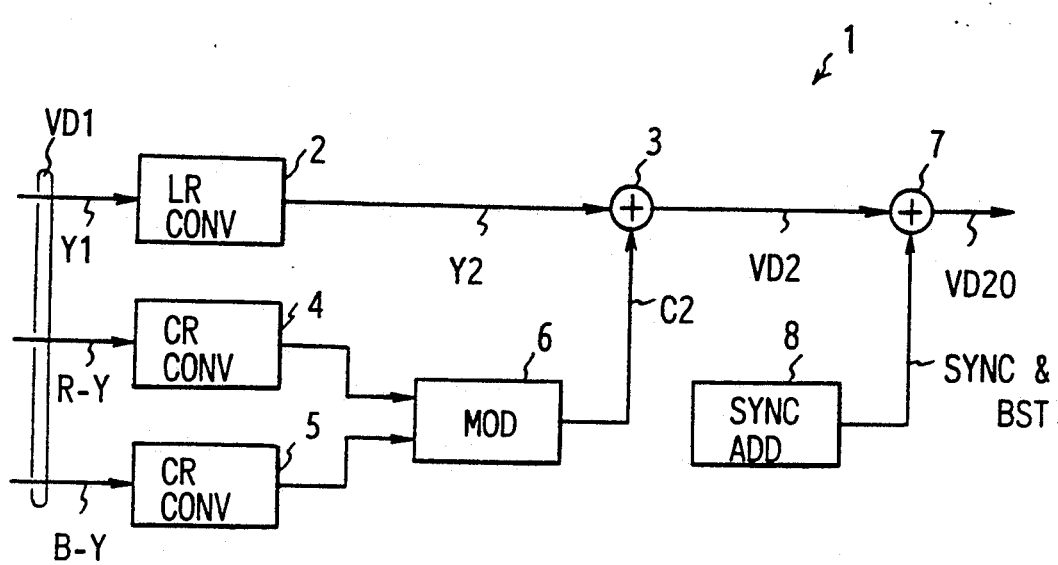
FIG. 1 is a block diagram showing the construction of conventional rate conversion device.
Figure 2A:
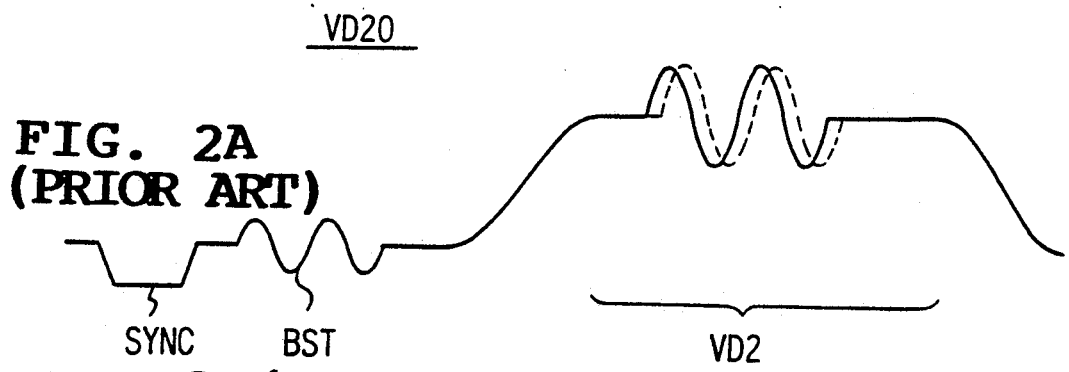
FIGS. 2A and 2B are waveform views showing the rate conversion method according to the conventional rate conversion device.
Figure 2B:
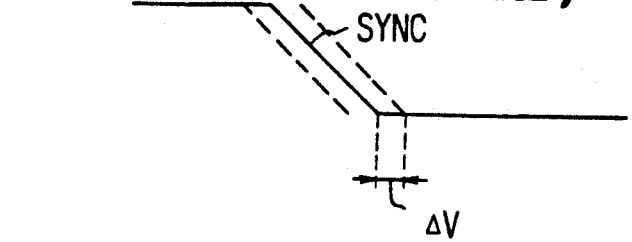
Figure 6:
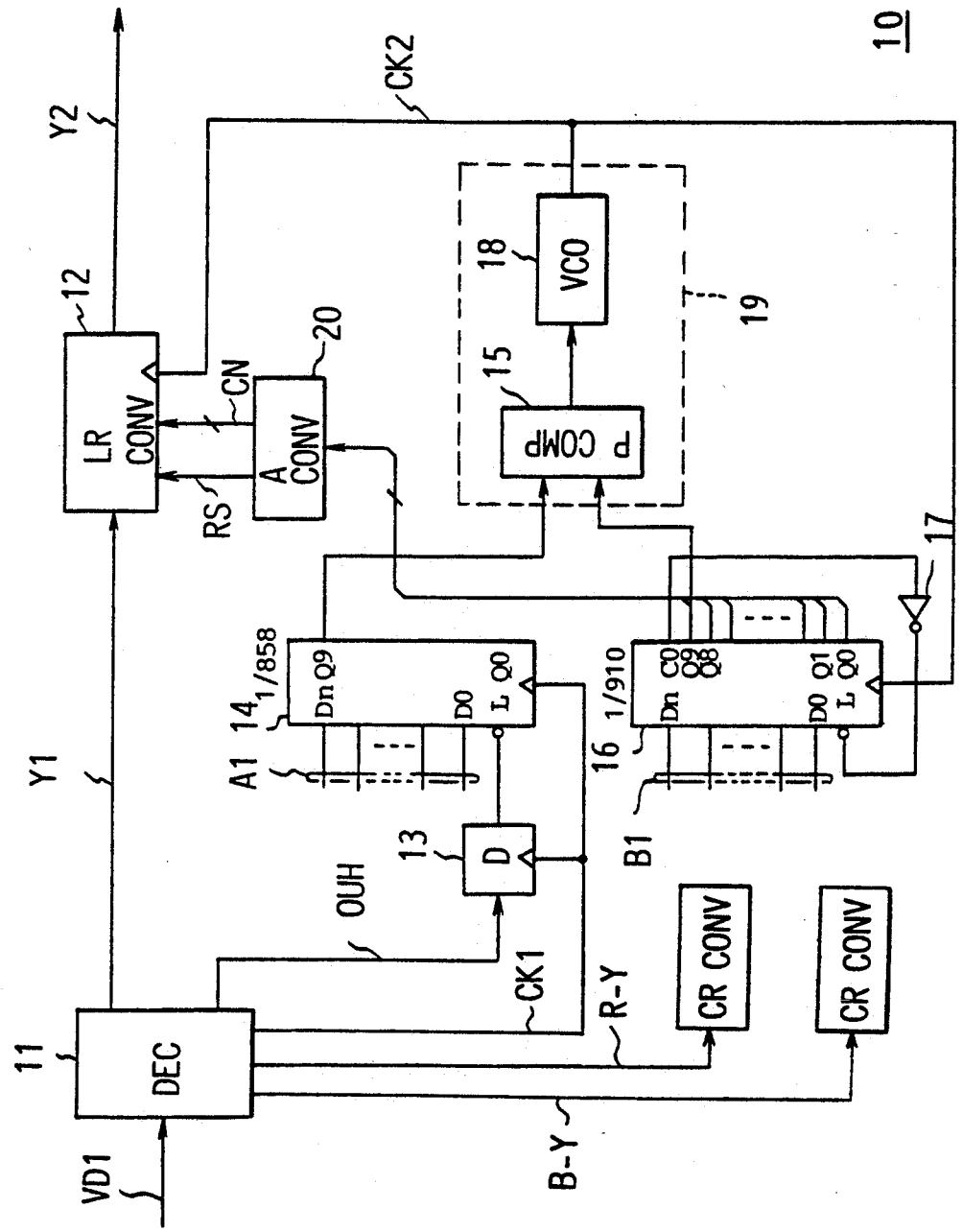
FIG. 6 is a block diagram illustrating the construction of rate conversion device according to the embodiment.

At this point, the rate conversion device 10 of this embodiment is constructed as shown in FIG. 6 in which corresponding parts of FIG. 1 are given the same reference numerals, the digital video signal VD1 of D-1 to be inputted is inputted to the 4:2:2 decoder 11 and is decoded, and the resultant luminance signal Y1 and color difference signals R-Y and B-Y will be inputted in the luminance rate converter 12 and the chrominance rate converters respectively, as same as the rate conversion device 1 in FIG. 1.

In addition to this, a video effective signal OUH wherein only effective part of the video signal has the logical "L" level, is outputted and inputted to the differentiating circuit 13 constituted by the D Flip-Flop and the logical gate, and at the same time the first sampling clock CK1 of D-1 format with frequency of 13.5 [MHz] is outputted and will be inputted as a clock of differentiating circuit 13 and 1/858 counter circuit 14 as described above.

The falling timing of video effective signal OUH is detected at the differentiating circuit 13 and the differentiating output is outputted to the load end L. As a result, in the 1/858 counter 14, the value 858 is added to the rising timing of video effective signal OUH, and the value A with which the highest bit Q9 among the count outputs Q0 to Q9 to fall at the 729 address of the digital video signal of D-1 is loaded and the first clock CK1 is counted; and the highest bit Q9 among the resultant count outputs Q0 to Q9 will be outputted to the phase comparison circuit 15.

Furthermore, the highest bit Q9 in the count outputs Q0 to Q9 of the 1/910 counter 16 which functions depending upon the second sampling clock CK2 of the D-2 format with a frequency of 14.3 [MHz] is inputted to the phase comparison circuit 15. In this 1/910 counter 16, in addition to the value 910 as described above, the value B1 with which the highest bit Q9 among the count outputs Q0 to Q9 to fall at the 778 address of the digital video signal of D-2 format is loaded depending on the carry CO of the count outputs Q0 to Q9 to be inputted to the load end L through an inverter 17.

Accordingly, the phase comparison circuit 15 outputs the comparison result depending on the difference of 729 address of the D-1 digital video signal and 778 address of the D-2 digital video signal to the voltage control type oscillation circuit (VCO) 18, and according to this comparison result thereof, controls the oscillation frequency of the VCO 18. The VCO 18 itself is adapted to oscillate the second sampling clock CK2 with 14.3 [MHz] frequency in the D-2 format and this second clock CK2 will be supplied to the rate conversion filter 12 and the 1/910 counter 16.

With this arrangement, a phase locked loop (PLL) 19 is constituted according to the phase comparison circuit 15 and the VCO 18 and as well as the first and second clocks CK1 and CK2 are controlled to synchronize by this PLL 19, the timing of 729 address of the D-1 digital video signal and the timing of 778 address of the D-2 digital video signal can be controlled to coincide.

Accordingly, in the rate conversion device 10, by coinciding the timing of 729 address of the D-1 digital video signal with the timing of 778 address of the D-2 digital video signal, the sync point in the post converted digital video signal of the D-2 can be obtained at the correct timing and the phase error can be avoided.

Moreover, in case of the rate conversion device 10 according to this embodiment, the count outputs Q0 to Q8 of the 1/910 counter 16 is inputted to the ROM constructed address converter 20 as the address data. The coefficient data CN to be outputted to the rate converter 12 is memorized in the memory of this address converter 20, and practically, the coefficient data is read and outputted to the rate converter 12 according to the address data changing 0 to 34, and if needed, the rate converter 12 will be reset.

Figure 7:
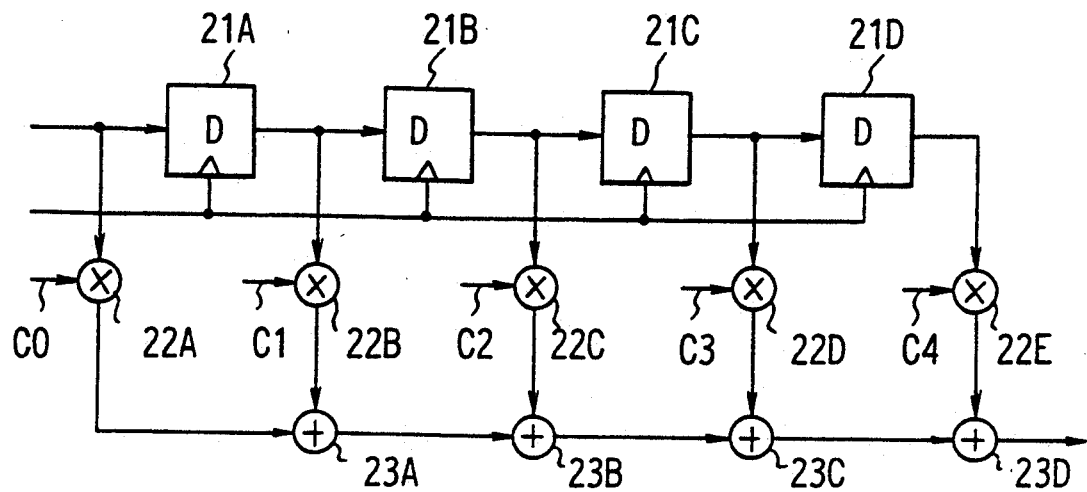
FIG. 7 is a connection diagram illustrating the construction of rate converter.

As shown in FIG. 7, this rate converter 12 comprises finite impulse response filter (FIR) type digital filter having D flip-flop 21A, 21B, 21C and 21D and multipliers 22A, 22B, 22C, 22D and 22E and adders 23A, 23B, 23C and 23D, combined, and the desired filter characteristic can be obtained in accordance with the coefficient data C0, C1, C2, C3 and C4 given to the multipliers 22A, 22B, 22C, 22D and 22E.

Figure 8:
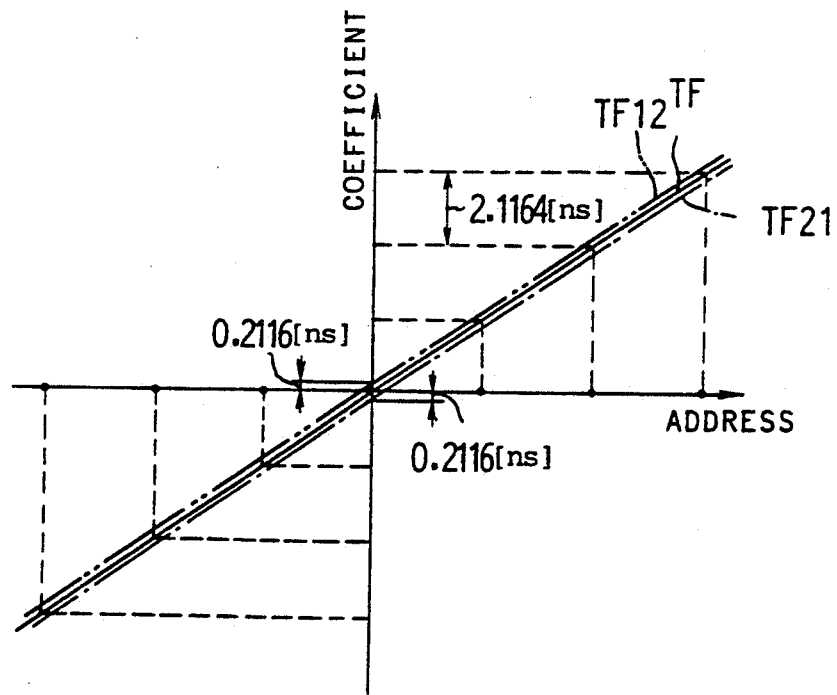
FIG. 8 is a characteristic curve view illustrating the phase characteristic of rate converter.

In this rate converter 12, as well as the high speed Fourier transformation (FFT) is executed on the luminance signal Y1 to be inputted, the time base is converted to the frequency base, and slides the phase for the fixed degree on the frequency base by integrating the prescribed coefficient data C0, C1, C2, C3 and C4, then returns the frequency base to the time base by executing the high speed Fourier transformation (FFT); accordingly, a filter characteristic TF12 having a group delay characteristic of 0.211674626 [ns] as shown in FIG. 8 by a chain line as compared with the filter characteristic TF of the regular over-sampling filter as indicated by a full line in FIG. 8, can be obtained.

Hence, in the rate conversion device 10, according to the present invention, by coinciding the 729 address timing of D-1 digital video signal with the 778 address timing of D-2 digital video signal, the sync point will be reproduced with the correct timing in the digital video signal of D-2 after conversion, and furthermore, since the filter characteristic TF12 of the rate conversion filter 12 is adapted to have the group delay characteristic to coincide the sync point of the D-1 digital video signal with the sync point of the D-2 digital video signal, the phase error can be avoided with further certainty.

According to the foregoing construction, since the filter characteristic TF12 of the rate converter 12 is arranged to have the group delay characteristic in order to coincide the sync points of digital video signals of D-1 and D-2 as well as coinciding the timing of 729 address and 778 address of the digital video signals of D-1 and D-2 respectively, the sync point can be reproduced in the D-2 digital video signal after conversion, and thus, the rate conversion device capable of avoiding the phase error can be obtained.

The embodiment discussed above has dealt with the case of obtaining the sync point with the correct timing in utilizing the rate converter having the group delay characteristic to coincide the sync point of D-1 digital video signal with the sync point of D-2 digital video signal in addition to coinciding the timings of the 729 address and the 778 address of the digital video signals of D-1 and D-2; however, each device may be utilized individually.

Moreover, the embodiment discussed above has dealt with the case of using the 1/858 counter and 1/910 counter. However, if the 1/33 counter and 1/35 counter are used in place of the above counters, the same effect as to those of the embodiment discussed above can be obtained.

Furthermore, the embodiment discussed above has dealt with the case of converting the rate from D-1 digital video signal to D-2 digital video signal; however, the present invention is not only limited to the above, but it is also applicable to the inverse case of converting from D-2 digital video signal to D-1 digital video signal. And in this case an effect similar to that of the embodiment discussed above will be achieved by using the filter characteristic TF21 having the group delay characteristic of 0.211674626 [ns] for the rate conversion filter as illustrated by 2 chain line in FIG. 8.

Furthermore, since the rate is converted in utilizing the filter means having the characteristic to coincide the sync points of the first and the second digital video signals, the sync points of the first digital video signal and the second digital video signal can be coincided and thus the digital video signal processing device capable of avoiding the phase difference of video signals in advance can be achieved.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. In a digital video signal processing device for converting a first digital video signal having a first format and a first sampling rate into a second digital video signal having a second format and a second sampling rate, in which said first and second digital video signals have respective sync points, a rate converting apparatus comprising:

means receiving said first digital video signal for obtaining a first clock signal therefrom;

clock synchronizing means receiving said first clock signal for generating a second clock signal therefrom such that a first predetermined timing interval of said first clock signal coincides with a second predetermined timing interval of said second clock signal; and sampling rate converting means receiving said second clock signal for converting said first sampling rate of said first digital video signal into said second sampling rate of said second digital video signal, said sampling rate converting means including means for coinciding sync points in said first digital video signal with sync points in said second digital video signal.

2. The rate converting apparatus according to claim 1, wherein said clock synchronizing means includes:

means for forming a first phase signal which corresponds to said first predetermined timing interval and a phase of the sync point of said first digital video signal on the basis of said first clock signal;

means for forming a second phase signal which corresponds to said second predetermined timing interval and a phase of the sync point of said second digital video signal on the basis of said second clock signal;

phase comparison means for comparing the phases of said first and second phase signals so as to generate a phase error signal representing a phase error therebetween; and oscillating means for generating said second clock signal in accordance with said phase error signal.

3. The rate converting apparatus according to claim 2, wherein: said means for forming the first phase signal includes a first counter which counts a first number of sample points generated between a first starting phase point of an effective video signal portion of said first phase signal to a first generating phase point portion thereof on the basis of said first clock signal; said means for forming the second phase signal includes a second counter which counts a second number of sample points generated between a second starting phase point of an effective video signal portion of said second phase signal to a second generating phase point thereof on the basis of said second clock signal; and said first and second digital video signals are synchronized with each other due to said phase error signal of said phase comparison means causing said oscillating means to generate said second clock signal having an oscillation frequency at which said phase error is zero.

4. The rate converting apparatus according to claim 1, wherein: said sampling rate converting means includes a finite impulse response filter receiving said second clock signal for providing an output signal therefrom having said second sampling rate.

5. The rate converting apparatus according to claim 4, wherein said sampling rate converting means further includes coefficient generating means for generating coefficient data in accordance with a count content from said means for forming the second phase signal and for supplying said coefficient data to said finite impulse response filter so as to adjust the phase of said first digital video signal supplied to said finite impulse response filter.

* * * * *